(12) United States Patent
Jia et al.

(10) Patent No.: US 12,046,760 B2
(45) Date of Patent: Jul. 23, 2024

(54) METHOD FOR MANUFACTURING COMPOSITE IN WHICH METAL AND METAL OXIDE ARE SUPPORTED

(71) Applicant: IDEMITSU KOSAN CO.,LTD., Chiyoda-ku (JP)

(72) Inventors: Qingxin Jia, Chiyoda-ku (JP); Ichitaro Waki, Chiyoda-ku (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 518 days.

(21) Appl. No.: 17/414,767

(22) PCT Filed: Dec. 19, 2019

(86) PCT No.: PCT/JP2019/049841
§ 371 (c)(1),
(2) Date: Jun. 16, 2021

(87) PCT Pub. No.: WO2020/130078
PCT Pub. Date: Jun. 25, 2020

(65) Prior Publication Data
US 2022/0006100 A1    Jan. 6, 2022

(30) Foreign Application Priority Data

Dec. 20, 2018 (JP) ................. 2018-238604

(51) Int. Cl.
*B01J 21/00* (2006.01)
*B01J 21/04* (2006.01)
(Continued)

(52) U.S. Cl.
CPC ............ *H01M 4/8842* (2013.01); *C25B 1/04* (2013.01); *C25B 1/23* (2021.01); *C25B 11/054* (2021.01);
(Continued)

(58) Field of Classification Search
CPC .......... B01J 21/00; B01J 21/04; B01J 21/063; B01J 21/066; B01J 21/08; B01J 21/10;
(Continued)

(56) References Cited

U.S. PATENT DOCUMENTS 4,788,176 A * 11/1988 Wieserman .......... B01J 20/3248
502/401
6,080,834 A *  6/2000 Putzig ................. B01J 31/0225
502/103

(Continued)

FOREIGN PATENT DOCUMENTS

CN        102631915 A      8/2012
CN        106179400 A     12/2016
(Continued)

OTHER PUBLICATIONS

Taiwanese Office Action issued on Jul. 12, 2023 in Taiwanese Patent Application No. 108146443 (with English translation), 8 pages.
(Continued)

*Primary Examiner* — Cam N. Nguyen
(74) *Attorney, Agent, or Firm* — Oblon, McClelland, Maier & Neustadt, L.L.P.

(57) ABSTRACT

A technique may produce a composite at a low temperature by a reducing agent that is easy to handle. A technique may produce a composite in which a metal simple substance or a metal oxide derived from reduced cations, or both of them are supported on a carrier. The technique may include at least: preparing a liquid phase mixture containing at least an alcohol compound as a first reducing agent, a phosphinic acid or a salt thereof as a second reducing agent, the carrier, and a source compound of one or more cations selected including Au, Ag, Cu, Pt, Rh, Ru, Re, Pd, and/or Ir; and reducing the cations in the liquid phase mixture.

16 Claims, 1 Drawing Sheet

(51) Int. Cl.

| | |
|---|---|
| *B01J 21/06* | (2006.01) |
| *B01J 21/08* | (2006.01) |
| *B01J 21/12* | (2006.01) |
| *B01J 21/18* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/48* | (2006.01) |
| *B01J 23/50* | (2006.01) |
| *B01J 23/52* | (2006.01) |
| *B01J 23/72* | (2006.01) |
| *B01J 23/89* | (2006.01) |
| *B01J 37/04* | (2006.01) |
| *B01J 37/08* | (2006.01) |
| *B01J 37/18* | (2006.01) |
| *C25B 1/04* | (2021.01) |
| *C25B 1/23* | (2021.01) |
| *C25B 11/054* | (2021.01) |
| *C25B 11/075* | (2021.01) |
| *C25B 11/081* | (2021.01) |
| *H01M 4/88* | (2006.01) |
| *H01M 4/90* | (2006.01) |
| *H01M 4/92* | (2006.01) |

(52) U.S. Cl.
CPC .......... *C25B 11/075* (2021.01); *C25B 11/081* (2021.01); *H01M 4/9041* (2013.01); *H01M 4/9075* (2013.01); *H01M 4/925* (2013.01)

(58) Field of Classification Search
CPC .......... B01J 21/12; B01J 21/18; B01J 21/185; B01J 23/40; B01J 23/42; B01J 23/44; B01J 23/46; B01J 23/462; B01J 23/464; B01J 23/468; B01J 23/48; B01J 23/50; B01J 23/52; B01J 23/72; B01J 23/8926; B01J 37/04; B01J 37/08; B01J 37/18; H01M 4/8842; H01M 4/9041; H01M 4/9075; H01M 4/925; C25B 1/04; C25B 1/23; C25B 11/054; C25B 11/075; C25B 11/081

See application file for complete search history.

(56) References Cited

U.S. PATENT DOCUMENTS

| | | | | |
|---|---|---|---|---|
| 7,192,670 | B2* | 3/2007 | Daimon | H01M 4/921 429/492 |
| 7,625,660 | B2* | 12/2009 | Daimon | H01M 4/923 429/483 |
| 7,704,918 | B2* | 4/2010 | Adzic | H01M 4/92 420/466 |
| 8,062,552 | B2* | 11/2011 | Adzic | B01J 37/0238 438/762 |
| 9,427,731 | B2* | 8/2016 | Allen | B01J 31/2208 |
| 9,517,460 | B2 | 12/2016 | Cho et al. | |
| 10,385,462 | B2* | 8/2019 | Merzougui | B01J 23/755 |
| 10,850,270 | B2* | 12/2020 | Yoo | B01J 37/349 |
| 11,014,084 | B2* | 5/2021 | Basak | B01J 35/06 |
| 2007/0180954 | A1 | 8/2007 | Kim et al. | |
| 2015/0328629 | A1 | 11/2015 | Cho et al. | |
| 2020/0376477 | A1* | 12/2020 | Wadman | B01J 35/023 |

FOREIGN PATENT DOCUMENTS

| | | |
|---|---|---|
| JP | 2005-81180 A | 3/2005 |
| JP | 2007-2299 A | 1/2007 |
| JP | 2011-90916 A | 5/2011 |
| JP | 2016-504187 A | 2/2016 |
| WO | WO 2014/104032 A1 | 7/2014 |

OTHER PUBLICATIONS

Combined Chinese Office Action and Search Report issued on Feb. 3, 2023 in Chinese Patent Application No. 201980083906.5 (with English translation of Office Action only), 10 pages.
International Search Report issued on Feb. 10, 2020 in PCT/JP2019/049841 filed on Dec. 19, 2019, 2 pages.

* cited by examiner

METHOD FOR MANUFACTURING COMPOSITE IN WHICH METAL AND METAL OXIDE ARE SUPPORTED

CROSS-REFERENCE TO RELATED APPLICATIONS

The present application is the national stage of international application PCT/JP2019/049841, filed on Dec. 19, 2019, and claims the benefit of the filing date of Japanese Appl. No. 2018-238604, filed on Dec. 20, 2018.

TECHNICAL FIELD

The present invention relates to a method for producing a composite containing a carrier and at least either of a metal simple substance and a metal oxide. More specifically, the present invention relates to a technique for producing a composite containing one or more of simple substances of Au, Ag, Cu, and Pt and oxides thereof on a carrier.

BACKGROUND ART

In technical fields of a fuel cell, a water or carbon dioxide gas electrolysis apparatus, a lithium ion secondary battery and the like, a composite obtained by supporting a metal simple substance or a metal oxide on a carrier is used as an electrode material or a catalyst. As a conventional technique for producing such a composite, various methods have been proposed (see Patent Literature 1).

CITATION LIST

Patent Literature

Patent Literature 1: JP 2007-002299 A

SUMMARY OF INVENTION

Technical Problem

One of such methods is a liquid phase reduction method. The liquid phase reduction method is a method of generating a liquid phase mixture in which a carrier for supporting a support to be a catalyst, a solution containing metal ions of a metal to be the support, and a reducing agent each coexist, and heating the liquid phase mixture to precipitate the support on the carrier. The metal ions in the liquid phase mixture are reduced by the reducing agent, and the reduced metal ions are precipitated as a metal simple substance or a metal oxide on the carrier.

Examples of the reducing agent used in the liquid phase reduction method include $N_2H_4$, $NaBH_4$, and the like. However, these reducing agents have extremely high reactivity and are difficult to handle. Therefore, safety is a problem.

On the other hand, in the liquid phase reduction method, an alcohol compound is also used. Since the alcohol compound is a mild reducing agent, it is easy to handle. However, when an alcohol compound is used as a reducing agent, it is necessary to cause a reduction reaction by long-time treatment at a high temperature over 100° C. The treatment at a high temperature for a long time leads to an increase in economic and time costs.

A main object of the present invention is to provide a technique for producing a composite at a low temperature by a reducing agent that is easy to handle.

Solution to Problem

That is, according to the present invention, there is provided a technique for producing a composite in which a metal simple substance or a metal oxide derived from a reduced cation, or both of them are supported on a carrier, including at least:

a preparation step of preparing a liquid phase mixture containing at least an alcohol compound, a phosphinic acid or a salt thereof, the carrier, and a source compound of cations of at least any one of Au, Ag, Cu, and Pt; and a reduction step of reducing the cations in the liquid phase mixture.

Advantageous Effects of Invention

According to the present invention, it is possible to provide a technique for producing a composite at a low temperature by a reducing agent that is easy to handle.

DESCRIPTION OF EMBODIMENTS

Figure 1A:
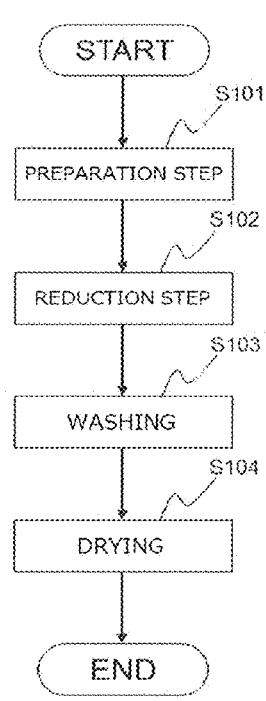
FIG. 1A is a flowchart showing a method for producing a composite suitably used in the present embodiment.

Hereinafter, the present invention will be described in detail with reference to the drawings.

The method of the present invention is carried out based on a liquid phase reduction method. That is, the method of the present invention includes a preparation step of preparing a predetermined liquid phase mixture, and a reduction step of reducing cations of the predetermined metal contained in the predetermined liquid phase mixture. Of course, other steps may be included, such as a washing step of washing the produced composite and a drying step of drying the produced composite.

In the preparation step, a predetermined liquid phase mixture is prepared. The predetermined liquid phase mixture contains at least an alcohol compound as a first reducing agent and phosphinic acid or a salt thereof as a second reducing agent. In addition, the predetermined liquid phase mixture contains at least a carrier that is an object to support a generated metal simple substance or the like, and a compound to be a source of cations of a predetermined metal to be reduced.

Any of the alcohol compound and the phosphinic acid or the salt thereof has a reducing ability. It is inferred that they cooperate to reduce metal cations.

In a mechanism of reduction action of phosphinate ion, as shown in the following (Formula 1), the phosphinate ion undergoes a dehydrogenation reaction to change into atomic hydrogen and a phosphite ion ($H_2PO_3^-$).

$$H_2PO_2^- + H_2O \rightarrow H_2PO_3^- + 2H \qquad \text{(Formula 1)}$$

This atomic hydrogen is a reducing species, which reduces metal cations. When only the phosphinate ion is heated at a low temperature, this dehydrogenation reaction hardly occurs, and the phosphinate ion does not function as a reducing agent. When an alcohol coexists, the dehydrogenation reaction of the phosphinate ion is promoted, and the phosphinate ion sufficiently functions as a reducing agent even at a low temperature.

Also, in the present application, since an alcohol compound is also used as a dispersion medium, an alcohol compound that is in a liquid phase in a temperature range of the preparation step and the reduction step under atmospheric pressure is used. Examples of such a compound include methanol, ethanol, 1-propyl alcohol, 1-butyl alcohol, isopropanol, ethylene glycol, propylene glycol, diethylene glycol, glycerin, and the like.

The alcohol compound is preferably an alcohol compound having 6 or less carbon atoms. Among them, ethylene glycol and propylene glycol are particularly preferable. This is because viscosities of these alcohol compounds are compatible with the method of the present application and are easily controlled.

The phosphinic acid is a monobasic acid represented by $HPH_2O_2$. Examples of the phosphinic acid salt include lithium phosphinate, sodium phosphinate, potassium phosphinate, ammonium phosphinate, and the like.

In the present invention, the carrier is not particularly limited as long as it is a solid substance capable of carrying and fixing a simple substance or an oxide of a predetermined metal. Typical examples thereof include a carbon carrier, a metal carrier, a metal nitride carrier, a metal carbide carrier, and a metal oxide carrier. These carriers may be in the form of particles, fibers, or sheets. When the carrier is in the form of particles or fibers, the carrier preferably has an average particle size or diameter of 50 nm or more and 10 μm or less.

Examples of the carbon carrier include graphite, amorphous carbon such as carbon fiber and activated carbon, carbon nanotube, carbon nanowall, carbon nanofiber, carbon alloy, and the like.

Examples of the metal carrier include stainless steel (SUS), brass, titanium (Ti), and the like.

Examples of the metal nitride carrier include aluminum nitride (AlN), silicon nitride ($Si_3N_4$), titanium nitride (TiN), zirconium nitride (ZrN), cerium nitride (CeN), and the like.

Examples of the metal carbide carrier include silicon carbide (SiC), titanium carbide (TiC), zirconium carbide (ZrC), cerium carbide (CeC), and the like.

Examples of the metal oxide carrier include alumina ($Al_2O_3$), silica ($SiO_2$), titania ($TiO_2$), zirconia ($ZrO_2$), ceria ($CeO_2$, $Ce_2O_3$), magnesia (MgO), and the like.

In the present invention, either a carrier of a hydrophilic material such as a metal oxide carrier or a carrier of a hydrophobic material such as a carbon carrier can be used. A main component of the liquid phase mixture is an alcohol compound, either material has a certain degree of affinity, and therefore the carrier can be uniformly dispersed in the liquid phase mixture.

In the present invention, the predetermined metal is one or more selected from the group including Au, Ag, Cu, Pt, Rh, Ru, Re, Pd, and Ir. That is, at least one of a gold simple substance, a silver simple substance, a copper simple substance, a simple substance of platinum and platinum group, and an oxide of the metal is present on the surface of at least a part of the carrier. These may be present in the form of particles, or may be present in the form of fibers or sheets. When the composite is used as a catalyst, the composite is preferably in the form of particles having a small particle size (particularly in the form of nanoparticles) from the viewpoint of improving catalyst performance. According to the method of the present invention, it is also possible to support nanoparticles of a simple substance or an oxide of a predetermined metal on the carrier.

In the present embodiment, Rh, Ru, Re, Pd, or Ir may be used as the predetermined metal described above instead of Pt. That is, at least one of rhodium simple substance, ruthenium simple substance, rhenium simple substance, palladium simple substance, iridium simple substance, rhodium oxide ($Rh_2O_3$, $RhO_x$), ruthenium oxide ($RuO_2$, $RuO_x$), rhenium oxide ($ReO_2$, $ReO_3$, $Re_2O_7$, $ReO_x$), palladium oxide (PdO, $PdO_x$), and iridium oxide ($IrO_2$, $IrO_x$) may be present on at least a part of the surface of the carrier.

A source compound of cations of the predetermined metal is not particularly limited, and any compound formed from cations of the predetermined metal can be used. Examples thereof include sulfates, nitrates, carbonates, acetates, oxides, hydroxides, fluorides, chlorides, bromides, sulfides, complex salts, and the like.

More specifically, examples of usable source compounds of cations of the predetermined metal include gold(I) chloride, gold(III) chloride, tetrachloroauric(III) acid, gold(III) bromide, gold(I) potassium cyanide, silver(I) nitrate, silver (I) cyanide, copper(II) sulfate, copper(II) nitrate, copper(II) carbonate, copper(I) acetate, copper(II) acetate, copper(II) citrate, copper(II) fluoride, copper(I) chloride, copper(II) chloride, copper(I) bromide, copper(II) bromide, platinum (II) chloride, platinum(IV) chloride, platinic(II) chloride, platinic(IV) chloride, platinum(II) bromide, platinum(IV) bromide, and the like.

A content ratio of the alcohol compound in the liquid phase mixture is preferably set to 50% by mass or more, 60% by mass or more, 70% by mass or more, or 80% by mass or more based on the total amount of the liquid phase mixture.

A content ratio of the phosphinic acid or the salt thereof in the liquid phase mixture is preferably set to 0.5 to 15% by mass based on the total amount of the liquid phase mixture.

A content ratio of the carrier in the liquid phase mixture is preferably set to 0.005 to 10% by mass based on the total amount of the liquid phase mixture.

A content ratio of the source compound in the liquid phase mixture is preferably set to 0.0001 to 0.02% by mass based on the total amount of the liquid phase mixture.

A content ratio of water in the liquid phase mixture is preferably 1% by mass or less based on the total amount of the liquid phase mixture. When a large amount of water is contained, a metal simple substance or oxide thereof, which is precipitated, is aggregated. When the precipitated metal simple substance or oxide thereof is aggregated, not only the particle size cannot be controlled to be small, but also uniformity of support may be hindered.

The content of the phosphinic acid or the salt thereof in the liquid phase mixture is preferably 1 time or more, 2 times or more, 3 times or more, 4 times or more, 5 times or more, 6 times or more, 7 times or more, 8 times or more, 9 times or more, or 10 times or more stoichiometrically with respect to a desired amount of a predetermined metal simple substance or oxide thereof to be supported on the carrier. By setting the content of the phosphinic acid or the salt thereof in the liquid phase mixture to the above content, a sufficient supporting rate is obtained. The upper limit of the phosphinic acid or the salt thereof in the liquid phase mixture is preferably 20 times or less stoichiometrically with respect to the desired amount. When it is attempted to use the phosphinic acid or the salt thereof more than 20 times, time for the phosphinic acid or the salt thereof to be dissolved in an alcohol compound such as ethylene glycol becomes extremely long, and it becomes impractical to obtain the liquid phase mixture. There is also a possibility that solubility in the solvent is saturated and the phosphinic acid or the salt thereof (for example, sodium phosphinate) is not dissolved. Therefore, for example, the content is preferably set to 20 times or less, 15 times or less, or 10 times or less stoichiometrically with respect to the desired amount.

Here, an example of the method for producing a composite described above will be described below with reference to FIGS. 1A to 1C.

<Preparation Step S101>

In the preparation step, an alcohol compound as a first reducing agent, a phosphinic acid or a salt thereof as a second reducing agent, a carrier that is an object to support a generated metal simple substance or the like, and a compound to be a source of cations of a predetermined metal to be reduced are added and mixed. The order of addition is not particularly limited. In the example of FIGS. 1A-1C, a carrier, a cation source compound, an alcohol compound, and phosphinic acid or a salt thereof are blended in this order.

Figure 1B:
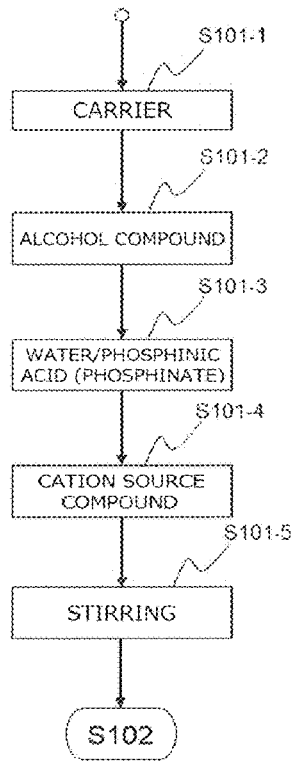
FIG. 1B is a flowchart showing details of a preparation step shown in FIG. 1A.
Figure 1C:
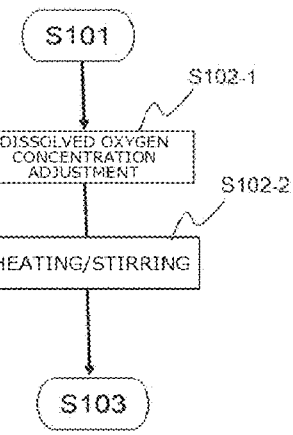
FIG. 1C is a flowchart showing details of a reduction step shown in FIG. 1A.

As shown in FIGS. 1A and 1B, in order to prepare the above-described liquid phase mixture, a carrier such as a carbon sheet or carbon particles is put into a predetermined container or device (not shown) (S101-1).

Thereafter, a predetermined amount of the alcohol compound such as ethylene glycol or propylene glycol is added to the predetermined container or device in accordance with a target supported amount of a metal simple substance or a metal oxide or both of them desired to be supported on the carrier (S101-2). Thereafter, the carrier is dispersed in the alcohol compound by stirring means such as ultrasonic stirring.

Likewise, a predetermined amount of a phosphinic acid or a salt thereof such as sodium hypophosphite or both of them is added to the container or device (S101-3).

Thereafter, a predetermined amount of a source compound of cations of a predetermined metal such as copper(II) nitrate is added to the container or device (S101-4).

When the predetermined liquid phase mixture materials are mixed, the liquid phase mixture is stirred by a predetermined stirring device (not shown) in order to make the mixture uniform (S101-5). Thereby, a liquid phase mixture having desired components is prepared (S101).

When phosphinic acid or a salt thereof is added, water may be added together in order to control the particle size of the predetermined metal desired to be supported. In addition, as described above, steps S101-1 to S101-4 are not necessarily performed in this order, and may be performed simultaneously, or may be changed by switching the order appropriately or the like.

<Reduction Step S102>

The liquid phase mixture prepared in the preparation step S101 is subjected to a next reduction step S102. In this reduction step, the cations of a predetermined metal derived from the source compound are reduced by the alcohol compound and the phosphinic acid or the salt thereof. This reduction causes one or both of precipitation and support on the carrier in the liquid phase mixture as a metal simple substance or a metal oxide or both of them. Therefore, the reduction step can also be expressed as a precipitation step or a supporting step.

The metal simple substance generated by reduction in the reduction step S102 is precipitated on the carrier in the liquid phase mixture. Alternatively, the reduced metal cation may be bound to oxygen dissolved in the liquid phase mixture to be precipitated as a metal oxide on the carrier. A generation ratio of precipitation of the metal simple substance and the metal oxide can be controlled by adjusting a dissolved oxygen concentration of the liquid phase mixture.

In the reduction step S102, first, the concentration of oxygen dissolved in the liquid phase mixture is adjusted based on a ratio between the metal simple substance and the metal oxide desired to be supported on the carrier (S102-1). The dissolved oxygen concentration can be controlled by bubbling a predetermined gas. For example, when it is desired to lower the oxygen partial pressure, an oxygen-free gas such as $N_2$ gas is bubbled. Conversely, when it is desired to increase the oxygen partial pressure, an oxygen-containing gas such as $O_2$ gas or air is bubbled. When it is not necessary to adjust the dissolved oxygen concentration, this step may not be performed.

After the dissolved oxygen concentration is arbitrarily adjusted, the liquid phase mixture is heated to a target temperature according to a predetermined metal by a heating device (not shown) and the liquid phase mixture is stirred at a predetermined rotation speed for a predetermined time by a stirring device (not shown) to proceed a reduction reaction (S102-2). The target temperature can be appropriately changed according to a metal cation to be reduced or the like.

When the metal cation to be reduced is a copper ion, the target temperature may be 40° C. or more, 50° C. or more, or 60° C. or more. When the metal cation to be reduced is another metal ion (for example, platinum ion, gold ion, or silver ion), the target temperature may be 30° C. or more, 40° C. or more, or 50° C. or more.

On the other hand, the target temperature is preferably less than 100° C., 90° C. or less, 80° C. or less, 70° C. or less, or 65° C. or less. Excessive heating is disadvantageous in terms of input energy. According to the method of the present invention, the reduction reaction sufficiently proceeds even at a temperature of less than 100° C. In addition, in the present invention, while sufficient reduction and precipitation occur even at a low temperature, excessive heating causes an excessive reduction reaction and causes aggregation of particles, and therefore it may be difficult to control the particle size.

Time required for the reduction step depends on various conditions, but is usually 0.1 to 10 hours or 0.5 to 4 hours.

By performing S102-1 to S102-2 as described above, the reduction step S102 is performed. The heating treatment and the stirring treatment may be performed individually.

<Washing Step S103>

According to the reduction step S102, a composite is obtained by supporting a metal simple substance or a metal oxide having a desired particle size or both of them on a carrier, then a washing solvent such as ethanol is added to the container or device, and the mixture is uniformly stirred to wash the generated composite (S103). At this time, the composite may be cooled from a predetermined reduction temperature to about room temperature (15° C. to 30° C.) as necessary. Further, this step may be performed a plurality of times. When washing of the composite is not necessary, this step may not be performed.

<Drying Step S104>

When the washing step S103 is completed, the obtained composite is heated to a predetermined temperature (60° C. to 90° C.) and dried under normal pressure conditions or under reduced pressure conditions (S104).

By appropriately performing the above steps S101 to S104, it is possible to generate a composite having a desired particle size and coverage. The particle size of particles such as the metal simple substance on the carrier and the ratio (coverage) at which the carrier is covered with the metal simple substance or the metal oxide can be appropriately changed according to the application.

The composite produced by the above method can be used as an electrode material or a catalyst.

When the composite is used as a catalyst, the supported metal simple substance or metal oxide is preferably nanoparticles having an average particle size of 1 nm or more and less than 1 μm, 1 nm or more and 500 nm or less, 1 nm or more and 100 nm or less, 1 nm or more and 10 nm or less, or 1 nm or more and 5 nm or less.

The average particle size of the carrier particles and the average particle size of the particles of the metal simple substance or the metal oxide supported on the carrier are measured by a scanning electron microscope (SEM) or a transmission electron microscope (TEM). In a SEM image at an appropriate magnification (for example, 50,000 to 200,000 times), the particle size when a certain particle is regarded as spherical is calculated. It is performed for 10 randomly selected particles, and the average value thereof is taken as the average particle size.

Examples

Hereinafter, embodiments of the present invention described above will be specifically described with reference to examples, but the present invention is not limited to these examples.

<Preparation of Liquid Phase Mixture>

Copper(II) nitrate was used as a source of metal cations, carbon particles were used as a carrier, and sodium phosphinate monohydrate was used as a phosphinate. To a flask containing 0.5 g of the carrier was added an alcohol compound or water of the type and amount (mL) shown in Table 1. Thereafter, sodium phosphinate in the amount shown in Table 1 was blended. Finally, 0.795 g of copper nitrate was blended, and the mixture was mixed uniformly to obtain a liquid phase mixture. The target supported amount (desired amount) of a copper simple substance to be supported on the carrier is 50% by weight when the weight of the carrier is 100% by weight. Sodium phosphinate was calculated stoichiometrically with respect to this target supported amount (for example, when the amount was stoichiometrically 10 times, 4.5 g of sodium phosphinate was blended). In order to support the metal simple substance, in this example, nitrogen gas bubbling was performed on the liquid phase mixture to remove dissolved oxygen in advance.

<Heating>

Each of the liquid phase mixtures was heated to the temperature (° C.) shown in Table 1 to reduce metal ions and support the metal on the carrier for 0.5 hours.

<Washing>

After completion of the reaction, the produced composite was taken out and washed several times with an appropriate amount of ethanol.

<Evaluation>

Figure 2:
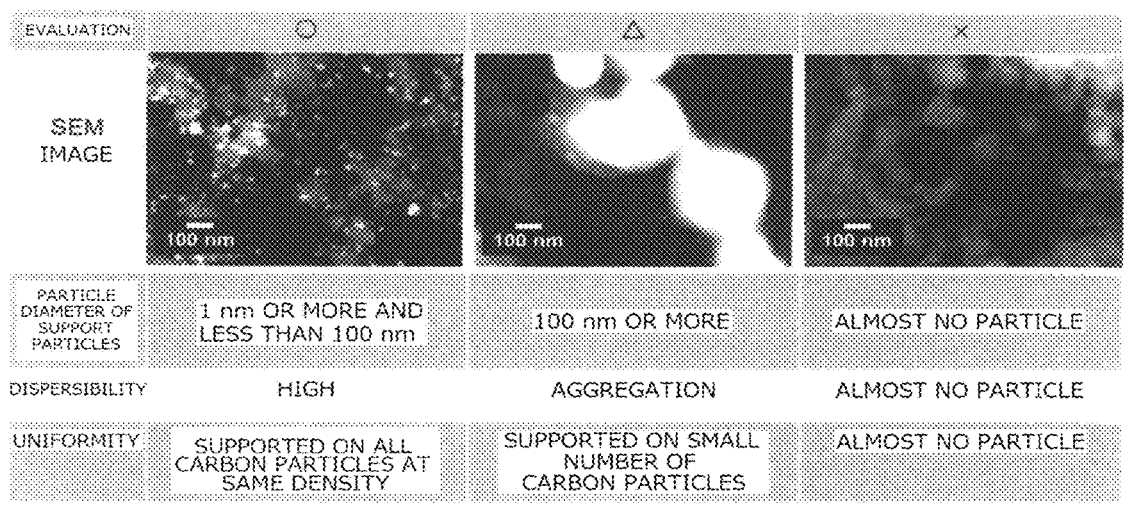
FIG. 2 shows evaluation criteria for a state in which a metal simple substance is supported in Examples.

The supported amount of the supported metal simple substance and the average particle size of the metal simple substance particles were evaluated by SEM (see FIG. 2). In FIG. 2, a portion that looks shining white is a metal simple substance. As shown in FIG. 2, one evaluated as "○" is a metal particle having an extremely small particle size (an average particle size of 1 nm or more and less than 100 nm), and shows a state in which the metal particles can be uniformly supported on a carrier. One evaluated as "x" cannot support a metal simple substance. One evaluated as "Δ" can support metal particles, but the particles may be an aggregate of nanoparticles, particles with micron or submicron order size having an average particle size of 100 nm or more, or non-uniformly supported.

TABLE 1

|  | Example 1 | Example 2 | Example 3 | Example 4 | Example 5 | Example 6 |
| --- | --- | --- | --- | --- | --- | --- |
| Ethylene glycol | 150 mL | 150 mL | 150 mL | 150 mL | 150 mL | 150 mL |
| Propylene glycol | — | — | — | — | — | — |
| Isopropanol | — | — | — | — | — | — |
| Water | — | — | — | — | — | — |
| NaPH$_2$O$_2$ | 3 Times | 1 Time | 10 Times | 11 Times | 10 Times | 10 Times |
| Temperature | 80° C. | 80° C. | 80° C. | 80° C. | 40° C. | 50° C. |
| Evaluation | ○ | Δ | ○ | ○ | Δ | ○ |

|  | Example 7 | Example 8 | Example 9 | Example 10 | Comparative Example 1 | Comparative Example 2 |
| --- | --- | --- | --- | --- | --- | --- |
| Ethylene glycol | 150 mL | 150 mL | — | — | 150 mL | — |
| Propylene glycol | — | — | 150 mL | — | — | — |
| Isopropanol | — | — | — | 150 mL | — | — |
| Water | — | — | — | — | — | 150 mL |
| NaPH$_2$O$_2$ | 10 Times | 10 Times | 10 Times | 10 Times | — | 4 Times |
| Temperature | 60° C. | 100° C. | 80° C. | 80° C. | 80° C. | 80° C. |
| Evaluation | ○ | Δ | ○ | ○ | x | x |

In Example 1, 150 mL of ethylene glycol was used as an alcohol compound as a first reducing agent and 3 times excess of the target supported amount of sodium phosphinate was used as a second reducing agent, and a result of performing the preparation step and the reduction step described above in a temperature zone of about 80° C. is shown. As a result of Example 1, the supported Cu had an average particle diameter of 5 to 50 nm, and could be confirmed to be uniformly dispersed and supported on the carrier.

In Example 2, 150 mL of ethylene glycol was used as an alcohol compound as a first reducing agent and the same magnification (1 time) as the target supported amount of sodium phosphinate was used as a second reducing agent, and a result of performing the preparation step and the reduction step described above in a temperature zone of about 80° C. is shown. As a result of Example 2, the supported Cu had an average particle diameter of 5 to 50 nm, and could be confirmed to be uniformly dispersed and supported on the carrier. However, the reaction is incomplete, and unreacted $Cu^{2+}$ ions are present even after the reaction for 4 hours.

In Example 3, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 80° C. is shown. As a result of Example 3, the supported Cu had an average particle diameter of 5 to 50 nm, and could be confirmed to be uniformly dispersed and supported on the carrier.

In Example 4, 150 mL of ethylene glycol was used as an alcohol compound as a first reducing agent and 11 times excess of the target supported amount of sodium phosphinate was used as a second reducing agent, and a result of performing the preparation step and the reduction step described above in a temperature zone of about 80° C. is shown. As a result of Example 4, the supported Cu had an average particle diameter of 5 to 50 nm, and could be confirmed to be uniformly dispersed and supported on the carrier.

In Example 5, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 40° C. is shown. As a result of Example 5, the supported Cu had an average particle diameter of 5 to 50 nm, and could be confirmed to be uniformly dispersed and supported on the carrier. However, the reaction is incomplete, and unreacted $Cu^{2+}$ ions are present even after the reaction for 4 hours.

In Example 6, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 50° C. is shown. As a result of Example 6, the supported Cu had an average particle diameter of 5 to 50 nm, and could be confirmed to be uniformly dispersed and supported on the carrier.

In Example 7, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 60° C. is shown. As a result of Example 7, the supported Cu had an average particle diameter of 5 to 50 nm, and could be confirmed to be uniformly dispersed and supported on the carrier.

In Example 8, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 100° C. is shown. As a result of Example 8, the supported Cu had an average particle diameter of 10 to 1000 nm, and could be confirmed to be uniformly dispersed and supported on the carrier.

In Example 9, 150 mL of propylene glycol was used as an alcohol compound as a first reducing agent and 10 times excess of the target supported amount of sodium phosphinate was used as a second reducing agent, and a result of performing the preparation step and the reduction step described above in a temperature zone of about 80° C. is shown. As a result of Example 9, the supported Cu had an average particle diameter of 5 to 50 nm, and could be confirmed to be uniformly dispersed and supported on the carrier.

In Example 10, 150 mL of isopropyl alcohol (IPA) was used as an alcohol compound as a first reducing agent and 10 times excess of the target supported amount of sodium phosphinate was used as a second reducing agent, and a result of performing the preparation step and the reduction step described above in a temperature zone of about 80° C. is shown. As a result of Example 10, the supported Cu had an average particle diameter of 5 to 100 nm, and could be confirmed to be uniformly dispersed and supported on the carrier.

In Comparative Example 1, 150 mL of ethylene glycol was added as an alcohol compound as a first reducing agent and sodium phosphinate was not added as a second reducing agent, and a result of performing the preparation step and the reduction step described above in a temperature zone of about 80° C. is shown. As a result of Comparative Example 1, it could be confirmed that the Cu particles were not reduced and could not be supported on the carrier.

In Comparative Example 2, as to a liquid phase mixture not added with ethylene glycol as an alcohol compound as a first reducing agent, using 4 times excess of the target supported amount of sodium phosphinate as a second reducing agent, and added with 150 mL of water ($H_2O$) instead of ethylene glycol, a result of performing the preparation step and the reduction step described above in a temperature zone of about 80° C. is shown. As a result of Comparative Example 2, it could be confirmed that the Cu particles were not reduced and could not be supported on the carrier.

When the same operation as in Example 6 was performed by changing the source of metal cations to tetrachloroauric (III) acid or silver nitrate, a gold simple substance or a silver simple substance could be supported on the carrier (see Examples 11 to 12). When the same operation as in Example 3 or 6 was performed by changing the source of metal cations to chloroplatinic acid, a platinum simple substance could be supported on the carrier (see Examples 13 to 14).

TABLE 2

|  | Example 11 | Example 12 | Example 13 | Example 14 |
|---|---|---|---|---|
| Metal species | Au | Ag | Pt | Pt |
| Ethylene glycol | 150 mL | 150 mL | 150 mL | 150 mL |
| $NaPH_2O_2$ | 10 Times | 10 Times | 10 Times | 10 Times |
| Temperature | 50° C. | 50° C. | 50° C. | 80° C. |
| Evaluation | ○ | ○ | ○ | ○ |

In Example 11, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 50° C. is shown. As a result of Example 11, the supported Au had an average particle diameter of 5 to 50 nm, and could be confirmed to be uniformly dispersed and supported on the carrier.

In Example 12, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 50° C. is shown. As a result of Example 12, the supported Ag had an average particle diameter of 5 to 50 nm, and could be confirmed to be uniformly dispersed and supported on the carrier.

In Example 13, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 50° C. is shown. As a result of Example 13, the supported Pt had an average particle diameter of 5 to 50 nm, and could be confirmed to be uniformly dispersed and supported on the carrier.

In Example 14, 150 mL of ethylene glycol was used as an alcohol compound as a first reducing agent and 10 times excess of the target supported amount of sodium phosphinate was used as a second reducing agent, and a result of performing the preparation step and the reduction step described above in a temperature zone of about 80° C. is shown. As a result of Example 14, the supported Pt had an average particle diameter of 5 to 50 nm, and could be confirmed to be uniformly dispersed and supported on the carrier.

In addition, when the same operation as in Example 6 was performed by changing the carrier to alumina ($Al_2O_3$) particles, a copper simple substance could be supported on the carrier. The supported state at that time corresponded to the evaluation "○".

The invention claimed is:

1. A method for producing a composite in which a metal and/or a metal oxide are supported on a carrier, the method comprising:
   preparing a liquid phase mixture comprising an alcohol compound as a first reducing agent, a phosphinic acid or a salt thereof as a second reducing agent, the carrier, and at least one metal compound of one or more cations selected from the group consisting of Au, Ag, Cu, Pt, Rh, Ru, Re, Pd, and Ir; and
   reducing the cations in the liquid phase mixture;
   wherein:
   a content of the phosphinic acid or the salt thereof is stoichiometrically 1 time or more and 20 times or less with respect to an amount of the metal and/or metal oxide to be supported on the carrier.

2. The method of claim 1, wherein a content ratio of water in the liquid phase mixture is 1% by mass or less based on a total liquid phase mixture mass.

3. The method of claim 2, wherein the alcohol compound comprises at least one selected from the group consisting of ethylene glycol and propylene glycol.

4. The method of claim 3, wherein the reducing is performed at a temperature of less than 100° C.

5. The method of claim 4, wherein a content of the phosphinic acid or the salt thereof is stoichiometrically 2 times or more and 20 times or less with respect to an amount of the metal and/or metal oxide to be supported on the carrier.

6. The method of claim 3, wherein a content of the phosphinic acid or the salt thereof is stoichiometrically 2 times or more and 20 times or less with respect to an amount of the metal and/or metal oxide to be supported on the carrier.

7. The method of claim 2, wherein the reducing is performed at a temperature of less than 100° C.

8. The method of claim 7, wherein a content of the phosphinic acid or the salt thereof is stoichiometrically 2 times or more and 20 times or less with respect to an amount of the metal and/or metal oxide to be supported on the carrier.

9. The method of claim 2, wherein a content of the phosphinic acid or the salt thereof is stoichiometrically 2 times or more and 20 times or less with respect to an amount of the metal and/or metal oxide to be supported on the carrier.

10. The method of claim 1, wherein the alcohol compound comprises at least one selected from the group consisting of ethylene glycol and propylene glycol.

11. The method of claim 10, wherein the reducing is performed at a temperature of less than 100° C.

12. The method of claim 11, wherein a content of the phosphinic acid or the salt thereof is stoichiometrically 2 times or more and 20 times or less with respect to an amount of the metal and/or metal oxide to be supported on the carrier.

13. The method of claim 10, wherein a content of the phosphinic acid or the salt thereof is stoichiometrically 2 times or more and 20 times or less with respect to an amount of the metal and/or metal oxide to be supported on the carrier.

14. The method of claim 1, wherein the reducing is performed at a temperature of less than 100° C.

15. The method of claim 14, wherein a content of the phosphinic acid or the salt thereof is stoichiometrically 2 times or more and 20 times or less with respect to an amount of the metal and/or metal oxide to be supported on the carrier.

16. The method of claim 1, wherein a content of the phosphinic acid or the salt thereof is stoichiometrically 2 times or more and 20 times or less with respect to an amount of the metal and/or metal oxide to be supported on the carrier.

* * * * *